United States Patent [19]

McDaniel

[11] 4,105,844

[45] Aug. 8, 1978

[54] CYCLOHEPTATRIENE ADJUVANT FOR CHROMIUM OXIDE CATALYST

[75] Inventor: Max Paul McDaniel, Bartlesville, Okla.

[73] Assignee: Phillips Petroleum Company, Bartlesville, Okla.

[21] Appl. No.: 829,369

[22] Filed: Aug. 31, 1977

[51] Int. Cl.$^2$ .......................... C08F 4/24; C08F 10/00; C08F 10/02

[52] U.S. Cl. .................................... 526/106; 526/352; 526/903

[58] Field of Search ................................ 526/106, 903

[56] References Cited

U.S. PATENT DOCUMENTS

| | | | |
|---|---|---|---|
| 3,562,241 | 2/1971 | Witt ........................................ | 526/106 |
| 3,891,611 | 6/1975 | Abe et al. ............................... | 526/903 |
| 3,939,137 | 2/1976 | Hogan et al. .......................... | 526/106 |
| 3,970,613 | 7/1976 | Goldie et al. ......................... | 526/106 |

*Primary Examiner*—Alan Holler

[57] ABSTRACT

Olefins are polymerized with a catalyst which forms on mixing a supported chromium oxide composite and an adjuvant which is 1,3,5-cycloheptatriene or an alkyl-substituted derivative thereof. This system allows the production of polymer of a given melt index at a higher temperature.

9 Claims, No Drawings

CYCLOHEPTATRIENE ADJUVANT FOR CHROMIUM OXIDE CATALYST

BACKGROUND OF THE INVENTION

This invention relates to the production of olefin polymers with a supported chromium oxide catalyst.

In the production of olefin polymers utilizing a solution process the production rate, that is, the pounds of polymer produced per unit of time per reactor, is limited by the viscosity of the polymerization medium. Thus, when the amount of polymer reaches a certain level, the viscosity of the polymer solution becomes too great to be handled by the filters and centrifuges. As a general proposition, the melt index of the polymer being produced varies with temperature, higher melt index (lower molecular weight) polymer being produced at the higher temperatures. Thus, this problem cannot be solved simply by raising the temperature since this produces a different polymer. Greater production rates could be obtained if polymer of a given melt index could be produced at a higher temperature since this would allow a greater concentration of polymer in the solution. It is further desirable to operate at a higher temperature so as to improve the efficiency of heat removal during the polymerization. Also higher reactor effluent temperature improves catalyst removal and solvent removal efficiency. Even in slurry polymerization processes where the melt index formed is inherently relatively low, there are applications for the resulting polymer such as high grade resin where an even lower melt index is needed.

Unfortunately, however, known additives for decreasing the melt index tend to reduce productivity, thus requiring a compromise between the desired melt index and high productivity.

SUMMARY OF THE INVENTION

It is an object of this invention to allow operation of an olefin polymerization process at a higher temperature;

It is a further object of this invention to reduce the melt index in an olefin polymerization process without adversely affecting productivity;

It is a further object of this invention to provide a catalyst which gives a lower melt index for a given polymerization temperature;

It is yet a further object of this invention to produce polymer of a given melt index at a relatively higher temperature;

It is still yet a further object of this invention to increase the production rate of an olefin polymerization process;

It is yet a further object of this invention to operate an olefin polymerization process in solution at a higher polymer concentration;

It is still yet a further object of this invention to improve heat transfer during polymerization;

It is still yet a further object of this invention to improve catalyst removal and solvent removal efficiency in solution processes;

It is still further an object of this invention to allow polymerization whether in solution or slurry at the optimum temperature and to adjust melt flow by means of an adjuvant; and It is still yet a further object of this invention to provide an improved olefin polymerization catalyst.

In accordance with this invention, a cycloheptatriene is introduced into an olefin polymerization system utilizing a supported chromium oxide catalyst.

DESCRIPTION OF THE PREFERRED EMBODIMENTS

The base or support for the chromium oxide portion of the catalyst system of this invention can be any conventional silicon-containing material such as silica, silica-alumina, silica-titania, and the like. The supports are particulate in nature and they can be prepared by precipitation and coprecipitation techniques, or by mixing silica with other refractory materials.

For example, sodium silicate can be added to an acid such as sulfuric acid, the resulting precipitate aged for at least 1 hour, and water-soluble salts removed by washing with water to thus produce an alkali metal-free hydrogel. Alkali metal ions can be more rapidly removed if the wash water contains an ammonium salt. The water is then removed by spray drying a water-hydrogel slurry or by drying in a conventional tray-dryer or by azeotrope drying. Silica generally constitutes the major portion of the support with other metal compounds when used making up from 0.1 to about 20 weight percent of the finished support.

Supports can be produced by coprecipitating an alkali metal silicate solution such as water glass and titanium or aluminum compounds such as titanyl sulfate or aluminum sulfate by adding said silicate to a mineral acid such as sulfuric acid, said acid containing said titanium or aluminum compound, to form a hydrogel. The hydrogel is preferably aged for a time of at least 1 hour. This hydrogel can then be treated in the manner described above to form the corresponding silica-titania or silica-alumina gel.

The support contains about 0.1 to 10, preferably 0.5 to 4 weight percent of chromium calculated as chromium oxide ($CrO_3$) based on the weight of the total support plus chromium oxide. The chromium can be added to the support in any manner known in the art such as impregnation with an aqueous solution of a chromium compound such as chromium oxide or chromium nitrate which is convertible to chromium oxide on calcination. Alternatively, a hydrocarbon solution of a chromium compound convertible to chromium oxide can also be used to impregnate the support. Alternatively, silica can be coprecipitated with a chromium compound or a chromium compound physically mixed with the support.

This chromium-containing support is then activated by calcining. Preferably this is done by heating at a temperature within the range of 700–2000, preferably 900°–1700° F for a time within the range of ½ to 50, preferably 1 to 10 hours in an oxygen-containing atmosphere such as dry air to convert at least a part of the chromium to the hexavalent state. Preferably this is carried out in a stream of fluidizing air which stream of fluidizing air is continued as the material is cooled.

1,3,5-Cycloheptatriene and alkyl-substituted derivatives thereof consisting of 1 to 4 alkyl groups, each group containing from 1 to 6 carbon atoms are the contemplated adjuvants of this invention. Exemplary compounds include 1,3,5-cycloheptatriene, 1-methyl-1,3,5-cycloheptatriene, 2-ethyl-1,3,5-cycloheptatriene, 7-butyl-1,3,5-cycloheptatriene, 7-n-hexyl-1,3,5-cycloheptatriene, 1,7-diethyl-1,3,5-cycloheptatriene, 5,7,7-trimethyl-1,3,5-cycloheptatriene, 2,3,7,7-tetramethyl-1,3,5-cycloheptatriene and mixtures thereof. These compounds are depicted by the formula:

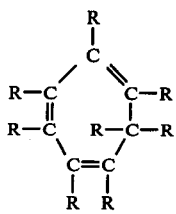

wherein R is selected from H and 1 to 6 carbon atom alkyl groups. The presently preferred compound is 1,3,5-cycloheptatriene.

The adjuvant of this invention is preferably added directly to the reactor either by being charged with catalyst and solvent or diluent or by being added as a separate stream. Generally, it is added as a dilute solution, i.e. about 0.005 to about 1 wt. %, in the same solvent or diluent used in the reactor, although any solvent inert in the process can be used. Also, the adjuvant can be used to pretreat the catalyst prior to charging it to the reactor. More concentrated solutions can be used in pretreating the catalyst but in any case it is essential to thoroughly mix the adjuvant solution with the catalyst. Mixing temperatures employed in pretreating are any convenient temperature ranging from about ambient room temperature, i.e. 20° C to about 180° C. The quantity of adjuvant used in pretreating the catalyst ranges from about 0.6 to about 25 wt. %, preferably about 1.2 to about 20 wt. %, based on the weight of total catalyst, that is the support plus the chromium compound and excluding the adjuvant. The catalyst should be used within a short time, i.e. within 1 hour for best results.

When the adjuvant is added as a separate stream to the reactor, the amount employed ranges from about 0.5 to about 25 parts by weight per million (ppm), preferably about 1 to about 20 ppm, based on the weight of diluent or solvent contained in the reactor. This amount is equivalent to the amount used in pretreating the catalyst. The term diluent is used to describe the inert hydrocarbon reaction medium whether the temperature is such that the polymer is dissolved or not.

In a continuous polymerization process in which catalyst and diluent are intermittently or continuously added to the reactor as a portion of the contents are removed for processing, it will be necessary to intermittently or continuously add pretreated catalyst or alternately adjuvant solution to the reactor to replace lost adjuvant. Thus, the desired concentration of adjuvant is always present in the reactor.

This invention is directed to the production of normally solid ethylene homopolymers or ethylene copolymers with a supported chromium oxide catalyst and 1,3,5-cycloheptatriene or a derivative, thereof, as an adjuvant for the catalyst. The polymers are made by contact with the catalyst and adjuvant in a particle form process or in a solution form process using the appropriate polymerization conditions. Such conditions are detailed in U.S. Pat. Nos. 3,939,137 (Hogan et al, Feb. 17, 1976) for solution form polymerization and 3,950,316 (Witt, Apr. 13, 1976) for particle form polymerization, the disclosures of which are hereby incorporated by reference.

Although the adjuvant of this invention depresses the melt index of polymer produced in its presence, it does not materially depress catalyst activity.

EXAMPLE

A silica-titania cogel hydrogel was prepared by comingling aqueous sodium silicate and aqueous sulfuric acid containing titanyl sulfate, aging the hydrogel and washing to reduce the sodium content to about 0.1 wt. % or less. The washed gel was then impregnated with a solution of chromium trioxide and the treated gel was dried by azeotrope distillation with ethyl acetate. The dry gel contained about 2 wt. % titanium and 1 wt. % chromium based on the weight of the final composite, the remainder being silica. Preparation of cogel is described in U.S. Pat. Nos. 3,887,494 and 3,950,316, the disclosures of which are hereby incorporated by reference. A sample of the dry composite was activated for polymerization by calcination in air for 5 hours at 1600° F (871° C). The product was cooled and stored in dry air. Samples of the catalyst were individually employed in the polymerization of ethylene in a particle form process in a stirred reactor at 230° F (110° C) and 550 psig (3.8 MPa gage) using isobutane as diluent. A 0.5 volume % solution of 1,3,5-cycloheptatriene (CHT) in n-hexane, when used, was added in a separate stream to the reactor. Catalyst weights, quantity of adjuvant employed and results obtained are given in the table.

Table 1

| Run No. | Catalyst wt. g. | CHT ppm | Polymer Yield g | Melt[1] Index | Melt[2] catalyst | Productivity g/g min. | Induction Time, min. | Run Time, min. |
|---|---|---|---|---|---|---|---|---|
| 1 | 0.0518 | 0 | 263 | 5.5 | 5.4 | 5080 | 39 | 50 |
| 2 | 0.0469 | 2.5 | 264 | 5.4 | 4.8 | 5630 | 50 | 40 |
| 3 | 0.0483 | 10 | 316 | 4.4 | 3.4 | 6540 | 54 | 51 |
| 4 | 0.0438 | 30 | —[3] | — | — | — | 60 | — |

[1]Value normalized to correspond to an equivalent productivity level of 5000 g polymer per g catalyst.
[2]Absolute values.
[3]After one hour induction time, the reaction had not started.

Inspection of the results indicates that 1,3,5-cycloheptatriene when used at a finite level greater than 1 ppm but less than 30 ppm is effective in reducing polymer melt index without simultaneously sacrificing catalyst productivity. The significance of the results lies in a consideration of the relationship that exists between activation temperatures employed with the supported chromium oxide catalysts and polymerization temperature on one hand and the productivity of the resulting catalysts and the polymer melt index obtained with them on the other hand. Generally, as the catalyst activation temperatures increases in the normal range from about 350° to about 2000° F (177°–1093° C), more usually from about 650° to about 1800° F (343°–982° C), the melt index of polymers made with the catalysts increases and catalyst productivity also increases. Polymerization temperature is directly related to polymer melt index in both particle form polymerization and solution form polymerization. Higher polymerization temperatures are inherently required in solution form polymerization to keep the polymer formed in solution. Therefore, when employing solution form polymerization, if low melt index polymer is desired, e.g. about 5 or lower as determined by ASTM D 1238-65T (Condition E), and more preferably about 0.1 to about 0.3, it has been necessary to activate the catalysts at about 1000° F (538° C). Catalyst productivity is not as high as desired at such catalyst activation temperatures. Consequently, in solution form polymerization, the resin producer seeks a high productivity catalyst which exhibits a low melt index potential at the relatively high polymerization temperatures used. By utilizing the instant invention, a high productivity conventional supported chromium oxide ethylene polymerization catalyst can be modified by addition of the specified cycloheptatriene compounds to produce lower melt index polymer without simultaneously lowering catalyst productivity in either solution or slurry systems.

While this invention has been described in detail for the purpose of illustration, it is not to be construed as limited thereby but is intended to cover all changes and modifications within the spirit and scope thereof.

I claim:

1. A polymerization process which comprises contacting at least one mono-1-olefin having 2 to 8 carbon atoms per molecule in the presence of a liquid diluent with a catalyst system comprising (1) a calcined support containing chromium in the form of chromium oxide, and (2) a compound of the formula

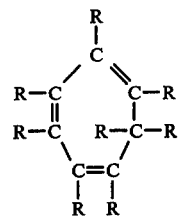

where R is selected from H and 1 to 6 carbon atom alkyl groups.

2. A method according to claim 1 wherein said olefin comprises ethylene.

3. A method according to claim 1 wherein said contacting is carried out at a temperature such that polymer formed is dissolved in said diluent.

4. A method according to claim 1 wherein said contacting is carried out at a temperature such that polymer formed is predominantly insoluble in said diluent.

5. A method according to claim 1 wherein said compound is one of 1,3,5-cycloheptatriene, 1-methyl-1,3,5-cycloheptatriene, 2-ethyl-1,3,5-cycloheptatriene, 7-butyl-1,3,5-cycloheptatriene, 7-n-hexyl-1,3,5-cycloheptatriene, 1,7-diethyl-1,3,5-cycloheptatriene, 5,7,7-trimethyl-1,3,5-cycloheptatriene, 2,3,7,7-tetramethyl-1,3,5-cycloheptatriene and mixtures thereof.

6. A method according to claim 5 wherein said compound is 1,3,5-cycloheptatriene.

7. A method according to claim 1 wherein said support comprises silica and said chromium is present in an amount within the range of 0.1 to 10 weight percent calculated as $CrO_3$ based on the weight of said support and chromium compound.

8. A method according to claim 1 wherein said diluent is cyclohexane.

9. A method according to claim 8 wherein said olefin comprises ethylene, said contacting is carried out at a temperature of about 230° F, said compound is 1,3,5-cycloheptatriene, and said support comprises silica containing 0.1 to 10 weight percent chromium based on the total weight of said support and $CrO_3$, and wherein said compound is present in an amount within the range of 0.5 to 25 ppm based on said diluent.

* * * * *